United States Patent [19]

Forrest

[11] 4,112,874
[45] Sep. 12, 1978

[54] LIVESTOCK TRANSPORT APPARATUS

[76] Inventor: William J. Forrest, 3400 NW. Expressway, Suite 704, Oklahoma City, Okla. 73112

[21] Appl. No.: 767,764

[22] Filed: Feb. 11, 1977

[51] Int. Cl.² .................... A01K 13/00; A61D 11/00
[52] U.S. Cl. ................................................. 119/158
[58] Field of Search ................... 119/158, 82; 214/394, 214/396; 134/123, 76

[56] References Cited

U.S. PATENT DOCUMENTS

| 880,665 | 3/1908 | Hopper | 119/82 |
|---|---|---|---|
| 1,207,815 | 12/1916 | Strong | 119/158 |
| 2,848,977 | 8/1958 | Prestrud et al. | 119/158 |
| 3,060,892 | 10/1962 | Schantz | 119/158 |
| 3,543,725 | 12/1970 | Kirpatrick et al. | 119/158 |

Primary Examiner—Hugh R. Chamblee
Attorney, Agent, or Firm—Dunlap, Codding & McCarthy

[57] ABSTRACT

A livestock transport apparatus particularly useful for transporting a disabled animal, such as a cow or the like, to a therapeutic apparatus, such as a whirlpool bath, the livestock transport apparatus also being utilized in general for transporting animals or other relatively large objects. In one embodiment, the livestock transport apparatus includes a movable frame, a cage and a positioning assembly for moving the cage to a first position wherein the cage is supported in a portion of the movable frame, to a second position wherein the cage is supported in a position generally above the first position and to a third position wherein the cage is supported in a position generally below the first position. In one operational embodiment, the cage is moved to the third position generally near the ground surface and the animal is moved into the cage. The cage then is raised via the positioning assembly to the second position and the movable frame is adjusted for supporting the cage. The cage then is lowered to the first position wherein a portion of the cage is engaged via the movable frame and, in this first position of the cage supported on the movable frame, the movable frame along with the animal retained within the cage is moved to another location. In one particular application, the livestock transport apparatus is utilized in conjunction with a whirlpool bath apparatus and, in this application, the cage is raised to the second position wherein the cage and the animal retained therein are supported generally above the whirlpool bath apparatus. Then, the cage and the animal retained therein are lowered via the positioning assembly to the third position wherein the animal is disposed within the whirlpool bath apparatus, the animal being supported in the cage within the whirlpool bath in this third position of the cage.

10 Claims, 7 Drawing Figures

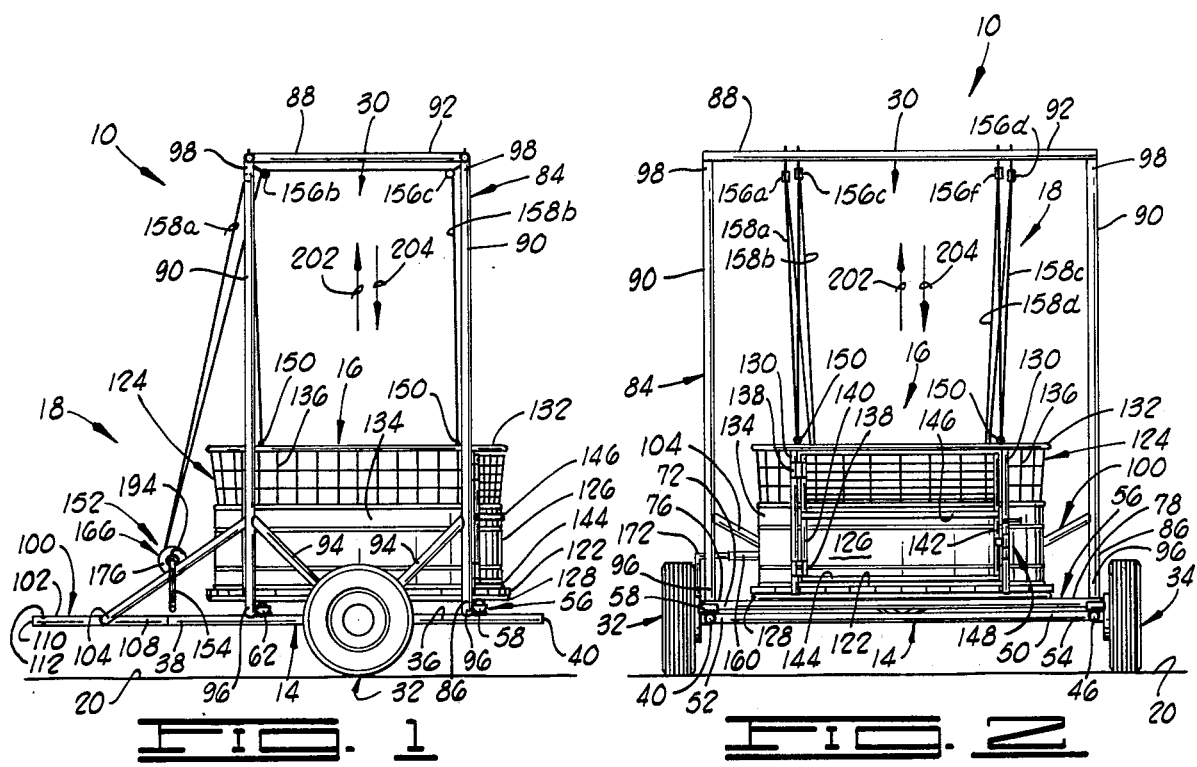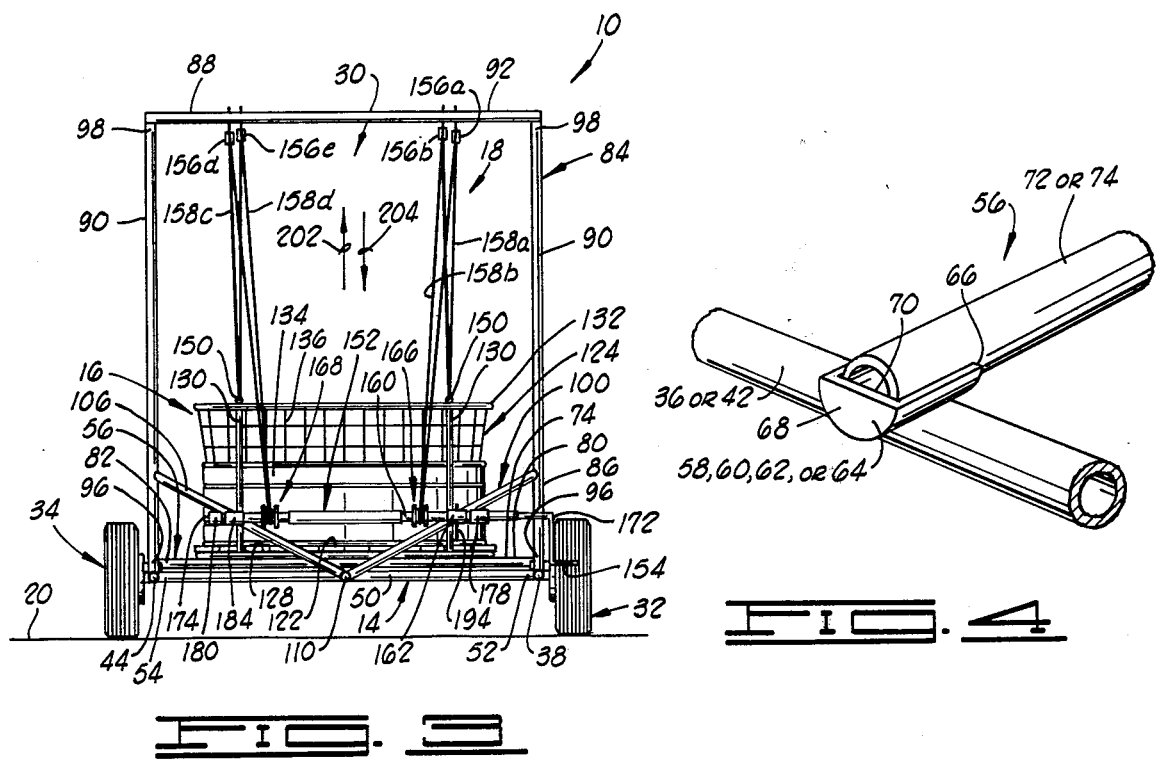

4,112,874

LIVESTOCK TRANSPORT APPARATUS

BACKGROUND OF THE INVENTION

1. Field of the Invention

The present invention relates generally to apparatus for transporting of animals and, more particularly, but not by way of limitation, to apparatus for transporting animals utilized in conjunction with the therapeutic treatment of such animals.

BRIEF DESCRIPTION OF THE FIGURES

FIG. 1 is a side elevational view of a livestock transport apparatus constructed in accordance with the present invention.

FIG. 2 is an end elevational view of the live-stock transport apparatus shown in FIG. 1.

FIG. 3 is another end elevational view of the livestock transport apparatus shown in FIG. 1 showing the end opposite the end view shown in FIG. 2.

FIG. 4 is an enlarged perspective view of a portion of the livestock transport apparatus of the present invention.

BRIEF DESCRIPTION OF THE PREFERRED EMBODIMENT

Figures 5, 6:
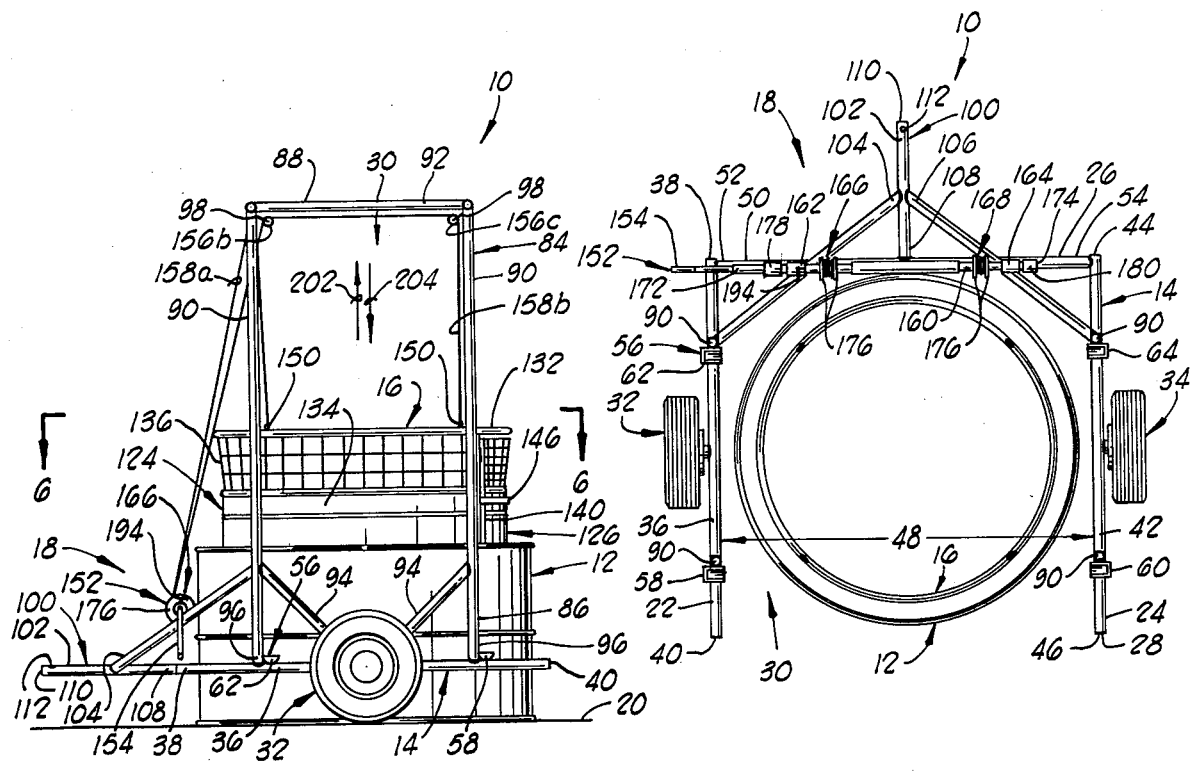
FIG. 5 is a side elevational view of the livestock transport apparatus similar to FIG. 1, the livestock transport apparatus being shown in combination with a whirlpool bath apparatus.
FIG. 6 is a top plan view of the livestock transport apparatus and the whirlpool bath apparatus shown in FIG. 5, taken substantially along the lines 6—6 of FIG. 5.

Referring to the drawings in general, and to FIGS. 1 through 3 in particular, shown therein and designated by the general reference numeral 10 is a livestock transport apparatus constructed in accordance with the present invention. In one embodiment, the livestock transport apparatus 10 is utilized in combination with a therapeutic treatment apparatus such as a whirlpool bath 12 (shown in FIGS. 5 and 6). The whirlpool bath apparatus 12 is a specially constructed apparatus designed to provide therapeutic treatment for a relatively large animal such as a cow or the like, and whirlpool baths of the type contemplated via the present invention are well known in the art and constructed from commercially available assemblies. In general, when a livestock animal becomes disabled, the animal is moved via the livestock transport apparatus 10 to a remote location where the livestock transport apparatus 10 then is utilized to insert the animal into the whirlpool bath 12 for therapeutic treatment. The livestock transport apparatus 10 also may be utilized for transporting animals for a variety of purposes frequently encountered during the operation of a farm or a ranch.

In general, the livestock transport apparatus 10 generally includes: a movable frame 14; a cage 16 having a portion engageable with a portion of the movable frame 14 in a first position (shown in FIGS. 1, 2 and 3) of the cage 16 wherein the cage 16 is supported in a position elevated a distance generally above the ground surface 20, and a positioning assembly 18 having a portion connected to the movable frame 14 and a portion connected to the cage 16 for movably positioning the cage 16 in the first position and for raising and lowering the cage 16 relative to the first position of the cage 16. More particularly, the positioning assembly 18 movably positions the cage 16 in a second position (shown in FIG. 5) wherein the cage 16 is supported a distance above the movable frame 14 and in a third position wherein the cage 16 is supported in a position disposed generally near the ground surface 20. In the embodiment of the present invention wherein the livestock transport apparatus 10 is utilized in conjunction with the whirlpool bath apparatus 12, the positioning assembly 18 moves the cage 16 to the second position wherein the cage 16 is supported generally above the whirlpool bath apparatus 12 and then the positioning assembly 18 moves the cage 16 to the third position wherein the cage 16 and the animal supported within the cage 16 are disposed within the whirlpool bath apparatus 12. In the first position of the cage 16 supported on a portion of the movable frame 14, the cage 16 is supported a sufficient distance above the ground surface 20 such that the livestock transport apparatus 10 can be moved from one location to another location via a vehicle (not shown), such as a pick-up type of truck, for example.

The movable frame 14 is a relatively rigid structure which provides the basic supporting structure for the various components and assemblies of the livestock transport apparatus 10. In general, the movable frame 14 has a first side 22, a second side 24, a forward end 26 and a rearward end 28. An opening 30 is formed through the movable frame 14 and a portion of the opening 30 intersects the rearward end 28 of the movable frame 14. The opening 30 and the cage 16 are each sized and shaped such that the cage 16 is movable to the third position and movable from the third position through the opening 30, for reasons to be made more apparent below.

The movable frame 14 is movably supported via a first wheel assembly 32 which is connected to the first side 22 of the movable frame 14, generally between the forward and the rearward ends 26 and 28, and a second wheel assembly 34 which is connected to the second side 24 of the movable frame 14, generally between the forward and the rearward ends 26 and 28. The wheel assemblies 32 and 34 cooperate to rollingly support the movable frame 14 a distance generally above the ground surface 20 so the movable frame 14 can be transported from one location to another location during the operation.

In one embodiment as shown more clearly in FIG. 6, the movable frame 14 includes: a first bar 36 having a first end 38 and a second end 40; a second bar 42 having a first end 44 and a second end 46, the second bar 42 being spaced a distance 48 from the first bar 36 and the second bar 42 extending in a direction generally parallel to the first bar 36, and a third bar 50 having a first end 52 and a second end 54, the third bar 50 extending generally between the first and the second bars 36 and 42. A portion of the third bar 50, generally near the first end 52 thereof, is connected to the first bar 36, generally near the first end 38 of the first bar 36, and a portion of the third bar 50, generally near the second end 54, is connected to the second bar 42, generally near the first end 44 of the second bar 42. The first bar 36 forms the first side 22 of the movable frame 14, the second bar 42 forms the second side 24 of the movable frame 14, the third bar 50 forms the forward end 26 of the movable frame 14, and the spacing between the first and the second bars 36 and 42 cooperates to provide the opening 30 in the movable frame 14.

The frame 14 also includes a cage support assembly 56 for engaging a portion of the cage 16 and supporting the cage 16 in the first position. The cage support assembly 56 includes a plurality of positioning cups 58, 60, 62 and 64. The positioning cup 58 is connected to the first bar 36 generally near the second end 40, the positioning cup 60 is connected to the second bar 42 generally near the second end 46, the positioning cup 62 is connected to the first bar 36 generally near the first end 38 and the positioning cup 64 is connected to the second bar 42 generally near the first end 44, the positioning cup 58 being spaced a predetermined distance from the positioning cup 62 and the positioning cup 60 being spaced a predetermined distance from the positioning cup 64, for reasons to be made more apparent below.

Each of the positioning cups 58, 60, 62 and 64 are constructed in a similar manner and, as shown more clearly in FIG. 4, each positioning cup 58, 60, 62, and 64 has an open end 66 and an opposite closed end 68. A slot 70 is formed in each positioning cup 58, 60, 62 and 64, each slot 70 extending generally between the ends 66 and 68. Each slot 70 is sized and shaped to retainingly receive a portion of a fourth bar 72 or a fifth bar 74, the positioning cups 58, 60, 62 and 64 cooperating to removably support the fourth and the fifth bars 72 and 74 in one position of the livestock transport apparatus 10. More particularly, the fourth bar 72 has a first end 76 and a second end 78, and a portion of the fourth bar 72 generally near the first end 76 is removably disposable within the slot 70 of the positioning cup 58, a portion of the fourth bar 72 generally near the second end 78 being removably disposable within the slot 70 of the positioning cup 60. In this position of the fourth bar 72, the fourth bar 72 extends across the opening 30 and between the first and the second bars 36 and 42, the fourth bar 72 being removably supported on the first and the second bars 36 and 42 via the positioning cups 58 and 60. The fifth bar 74 has a first end 80 and a second end 82, and a portion of the fifth bar 74 generally near the first end 80 is removably disposable within the slot 70 of the positioning cup 62, a portion of the fifth bar 74 generally near the second end 82 being removably disposable within the slot 70 of the positioning cup 64. In this position of the fifth bar 74, the fifth bar 74 extends across the opening 30 and between the first and the second bars 36 and 42, the fifth bar 74 being removably supported on the first and the second bars 36 and 42 via the positioning cups 62 and 64. In the position of the movable frame 14 with the fourth and fifth bars 72 and 74 supported via the positioning cups 58, 60, 62 and 64, the fourth bar 72 is spaced a predetermined distance from the fifth bar 74 and each of the bars 72 and 74 are supported in a position for engaging portions of the cage 16 and supporting the cage 16 in the first position, the bars 72 and 74 preventing the cage 16 from being moved through the opening 30 formed in the movable frame 14.

The positioning assembly 18 includes a hoisting frame 84 which is connected to the movable frame 14 and extends a distance generally vertically therefrom. The hoisting frame 84 has a lower end 86 and an upper end 88, the lower end 88 being connected to the movable frame 14 and the hoisting frame 84 extending generally vertically upwardly from the movable frame 14 terminating with the upper end 88.

The hoisting frame 84 includes a plurality of upwardly extending posts 90, which are connected to the movable frame 14; a plurality of horizontally extending bars 92, which are connected generally between the posts 90 at the upper end 88 of the hoisting frame 84; and a plurality of angle braces 94, which are connected generaly between the posts 90 and the movable frame 14 at the lower end 86 of the hoisting frame 84.

Each post 90 has a lower first end 96 secured to the movable frame 14, and an opposite upper second end 98 extending from the first end 96 to the upper end 88 of the hoisting frame 84. In the one embodiment shown in the drawings, four of the posts 90 are utilized.

A draw bar assembly 100 is connected to the forward end 26 of the movable frame 14. The draw bar assembly 100 facilitates the coupling of the livestock transport apparatus 10 to a towing vehicle (not shown) such as a tractor or a pick-up truck or the like. The draw bar assembly 100 includes: a tongue 102, and a first and a second angle brace 104 and 106, respectively.

The tongue 102 extends perpendicularly from a medial portion of the third bar 50 of the movable frame 14 in a forward direction, generally opposite the direction the first and the second bars 36 and 42 extend from the third bar 50. The tongue 102 has a first end 108, which is secured to the third bar 50, and an opposite second end 110. A bore 112 is formed through a portion of the tongue 102, generally near the second end 110 thereof. The bore 112 may be utilized to facilitate the coupling of the livestock transport apparatus 10 to a towing vehicle in a conventional fashion, such as via a pin-and-cotter key assembly (not shown), for example.

The first angle brace 104 of the draw bar assembly 100 is secured between a medial portion of the tongue 102 and a portion of one of the posts 90, generally near the lower end 96 thereof. The second angle brace 106 of the draw bar assembly 100 is secured between a medial portion of the tongue 102, opposite the angle brace 104 and a portion of one of the posts 90, generally near the lower end 96 thereof. The first and the second angle braces 104 and 106 cooperate to enhance the structural integrity of the livestock transport apparatus 10.

The cage 16 is a supportive enclosure in which an animal such as a cow or the like can be safely transported. In one form, the cage 16 is generally cylindrically shaped and includes: a circularly shaped floor 122; a wall 124 which is connected to the floor 122 and extends a distance generally vertically upwardly from the floor 122, the wall 124 extending about a portion of the floor 122 and substantially enclosing a space; and a gate 126, which is formed in the wall 124 and has an opened position and a closed position, the gate 126 cooperating with the wall 124 to form a substantially enclosed space for retaining livestock during the operation of the livestock transport apparatus 10.

The wall 124 generally includes a circularly shaped lower ring 128, a plurality of wall posts 130, and a circularly shaped upper ring 132. The lower ring 128 and the upper ring 132 are similar in construction and each of the rings 128 and 132 is preferably integrally constructed of a rigid material. The wall posts 130 are secured between the lower ring 128 and the upper ring 132 such that the lower and upper rings 128 and 132 are disposed and supported in a parallel, spaced-apart relationship. It should also be noted that a lower end of each of the wall posts 130 is secured to an upper portion of the lower ring 128, and an opposite upper end of each of the wall posts 130 is secured to a lower portion of the upper ring 132. In the preferred embodiment, four of the wall posts 130 are utilized, and the posts 130 are spaced approximately 90° apart circumferentially about the rings 128 and 132. The wall posts 130 cooperate to define the depth of the cage 16, and to enhance the structural integrity of the cage 16.

The floor 122 is secured to and supported by the lower ring 128, the floor 122 being constructed to safely support an animal, such as a cow or the like. The floor 122 is also preferably constructed to be easily cleaned and to permit efficient drainage of water, the floor 122 generally being constructed of a conventional material such as lumber components or the like. Some portions of the floor 122 may be notched so as to fit around the lower ends of the wall posts 130, as shown most clearly in FIG. 3.

In one form, the wall 124 has a lower portion 134, which is generally solid and constructed of sheet metal or the like, and an upper portion 136, which is constructed of conventional fence material or expanded metal or the like.

An opening is formed through the wall 124 generally between two of the wall posts 130. The gate 126 is hingedly connected to one of the posts 130 via conventional hinges 138 such that, in a closed position of the gate 126, the opening formed through the wall 124 is substantially covered or closed by the gate 126. More particularly, the gate 126 is comprised of first and second gate posts 140 and 142, and lower and upper gate bars 144 and 146.

The first gate post 140 is connected to the hinges 138 such that the first gate post 140 is pivotal about one of the wall posts 130. More particularly, the first gate post 140 extends from near the floor 122 to a position generally near the upper ring 132 of the wall 124. The lower gate bar 144 extends generally perpendicularly from the lower end portion of the first gate post 140, and, in the closed position of the gate 126, the lower gate bar 144 is parallel to an adjacent portion of the lower ring 128 and extends to a position generally near one of the wall posts 130 of the wall 124. The upper gate bar 146 is similar in construction to the lower gate bar 144 and extends generally perpendicularly from a medial portion of the first gate post 140 in a parallel, spaced-apart relationship with respect to the lower gate bar 144. The second gate post 142 is similar in construction to the first gate post 140, and is secured to the lower and upper gate bars 144 and 146 much the same as described before with respect to the first gate post 140.

As shown more clearly in FIG. 2, interconnecting portions of a latching assembly 148 are connected to adjacent portions of one of the posts 130 of the cage 16 and the second gate post 142 of the gate 126 when the gate 126 is in the closed position for maintaining the gate 126 in the closed position. The latching assembly 148 is a conventional type of latching assembly such as a conventional bolt-and-sleeve type, for example.

A plurality of eye hooks 150 are secured to upper portions of the upper ring 132 to facilitate connecting the cage 16 to the positioning assembly 18. In the preferred embodiment, four of the eye hooks 150 are utilized, and each eye hook 150 is secured to the upper ring 132, generally adjacent the wall posts 130 such that the eye hooks 150 are spaced approximately 90° apart generally circumferentially about the upper ring 132.

The positioning assembly 18 is connected to the frame 14 and is connectable to the cage 16 such that the cage 16 may be selectively positioned. The positioning assembly 18 includes: a winch assembly 152, which is rotatably connected to the draw bar assembly 100; a hand crank 154 which is connected to the winch assembly 152; a plurality of pulleys 156, the pulleys 156 being connected to the hoist frame 84; and a plurality of cables 158, the cables 158 being connected to the winch assembly 152 and to the cage 16 via the eye hooks 150 with the pulleys 156 supporting the cables 158.

The winch assembly 152 is rotatably supported by the movable frame 14 so that the cables 158 can be retrieved or released for selectively positioning the cage 16. When the cage 16 is in the first position supported on the fourth and the fifth bars 72 and 74 or in the third position, the cables 158 can be retrieved thereby moving the cage 16 in an upwardly vertical direction. On the other hand, when the cage 16 is in the raised position, the cables 158 can be released thereby moving the cage 16 to a lower position. The winch assembly 152 includes: a shaft 160, a first and a second bearing support 162 and 164, respectively, and a first and a second collar assembly 166 and 168, respectively.

The first bearing support 162 is secured to a medial portion of the first angle brace 104 of the draw bar assembly 100. The second bearing support 164 is secured to a medial portion of the second angle brace 106 of the draw bar assembly 100. In one embodiment, the first and second bearing supports 162 and 164 are constructed of a tubular material such as conventional pipe components or the like, for example. Corresponding shaft openings (not shown) are formed through the first and second bearing supports 162 and 164, such that the shaft openings are in axial alignment with an axis of rotation 170. A locking pin opening (not shown) is formed diametrically through a medial portion of the first bearing support 162.

The shaft 160 is disposed through the shaft openings and supported for rotation about the axis of rotation 170. The shaft 160 has a first end 172 which is disposed near the first bearing support 162, and an opposite second end 174 which is disposed near the second bearing support 164. The first collar assembly 166 is secured to the shaft 160 generally between the first and second angle braces 104 and 106 and generally near the first bearing support 162, and the second collar assembly 168 is secured to the shaft 160 generally between the first and second angle braces 162 and 164 and generally near the second bearing support 164. Each of the collar assemblies 166 and 168 includes a pair of platelike collars 176 which are disposed over and secured to predetermined portions of the shaft 160. The two associated collars 176 forming each respective collar assembly 166 and 168 are positioned in a parallel, spaced-apart relationship with an open space formed therebetween. Corresponding cable openings (not shown) are formed diametrically through portions of the shaft 160, generally between each pair of the collars 176.

A first sleeve 178 is secured to a portion of the shaft 160, generally adjacent the first bearing support 162 and generally between the first bearing support 162 and the first end 172 of the shaft 160. A second sleeve 180 is secured to the second end 174 of the shaft 160, generally adjacent the second bearing support 164. The first sleeve 178 and the second sleeve 180 cooperate to prevent axial movement of the shaft 160 such that the first and second collar assemblies 166 and 168 are maintained in a predetermined position.

The livestock transport apparatus 10 includes six pulleys which are identified in the drawings via the reference numerals 156a, 156b, 156c, 156d, 156e and 156f. The pulley 156a is secured to a lower portion of one of the bars 92 of the hoisting frame 84. The pulley 156b is secured to a lower portion of one of the bars 92 generally adjacent the pulley 156a. The pulley 156c is secured to a lower portion of one of the bars 92 of the hoisting frame 84 generally near one of the bars 92. The pulley 156b and the pulley 156c are disposed such that the respective grooves formed circumferentially thereabout are substantially in alignment. The pulley 156d is secured to a lower portion of one of the bars 92. The pulley 156e is secured to a lower portion of one of the bars 92 generally adjacent the pulley 156d and generally between the pulley 156d and the pulley 156b. The pulley 156f is secured to a lower portion of one of the bars 92. The pulleys 156e and 156f are disposed such that the respective grooves formed circumferentially thereabout are substantially in alignment.

Figure 7:
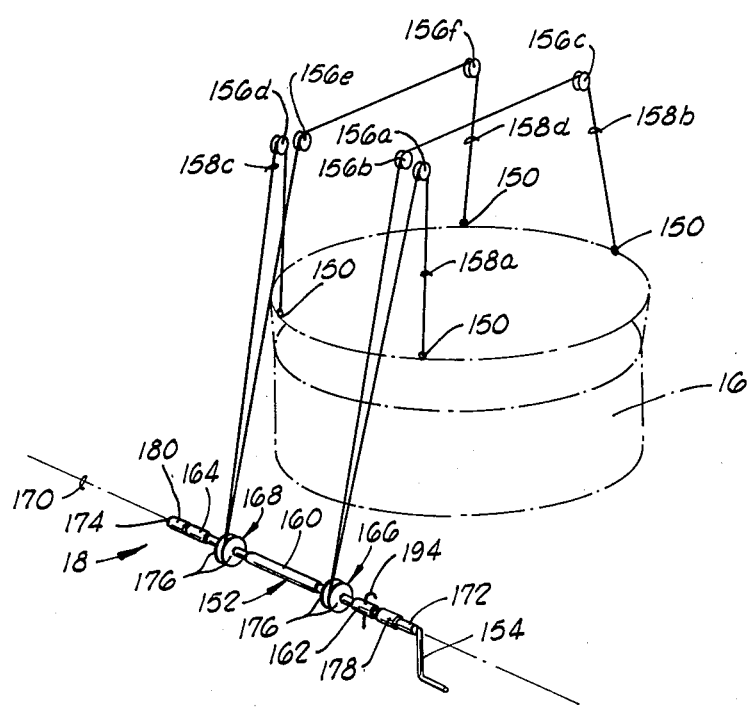
FIG. 7 is a diagrammatic view showing a portion of the livestock transport apparatus of the present invention, a portion of the livestock transport apparatus being shown in dashed-lines for clarity.

As shown more clearly in FIG. 7, in the raised position of the cage 16, each of the cables 158 (the four cables being designated in the drawings via the reference numerals 158a, 158b, 158c and 158d) has one end which is connected to the winch assembly 152 and an opposite end which is connected to the cage 16. Medial portions of each cable 158 are supported by one of the pulleys 156 during the operation.

One end of the cable 158a is secured through the cable opening (not shown) which is adjacent the first collar assembly 166. A medial portion of the cable 158a is supported via the grooved portion of the pulley 156a and the opposite end of the cable 158a is secured through one of the eye hooks 150.

One end of the cable 158b is secured through the cable opening (not shown) which is adjacent the first collar assembly 166. A medial portion of the cable 158b is supported via the grooved portion of the pulley 156b, and another medial portion near the opposite end of the pulley 156b is supported via the grooved portion of the pulley 156c, the opposite end of the cable 158b being secured through one of the eye hooks 150.

One end of the cable 158c is secured through the cable opening (not shown) which is adjacent the second collar assembly 168. A medial portion of the cable 158c is supported via the grooved portion of the pulley 156d, and the opposite second end of the cable 158c is secured through one of the eye hooks 150.

One end of the cable 158d is secured through the cable opening (not shown) which is adjacent the second collar assembly 168. A medial portion of the cable 158d, generally near the end of the cable 158d is supported via the grooved portion of the pulley 156e, and another medial portion of the cable 158d is supported via the grooved portion of the pulley 156f. The opposite end of the cable 158d is secured through one of the eye hooks 150.

The cables 158a and 158c are disposed in a substantially parallel, spaced-apart relationship. The cables 158b and 158d are also disposed in a substantially parallel, spaced-apart relationship.

At least one locking pin opening is formed diametrically through a portion of the shaft 160 which is enclosed by the first bearing support 162. More particularly, in one position of the shaft 160, the locking pin opening formed through the shaft 160 and the locking pin opening formed through the first bearing support 162 are axially aligned. Therefore, when the cage 16 has been moved to the desired position and when the locking pin openings are in axial alignment, a locking pin 194 can be inserted through the locking pin openings, thereby preventing further rotation of the hand crank 154. In this manner, only one operator is needed to effectuate the necessary positioning of the livestock transport apparatus 10 and the various components and assemblies thereof.

Operation of the FIGS. 1 through 7

Initially it will be assumed that the cage 16 is in the first position and the whirlpool bath apparatus 12 is substantially filled with a suitable type of liquid such as heated water, for example. Further, it will be assumed that the livestock transport apparatus 10 is coupled to a conventional towing vehicle via the draw bar assembly 100.

When a livestock animal, such as a cow, becomes disabled (for example, partial paralysis resulting from calving), it is necessary to transport the animal from one location to another location generally near the whirlpool bath apparatus 12 to facilitate the therapeutic treatment of the animal. The livestock transport apparatus 10 is towed to a position generally near the disabled animal. The locking pin 194 is removed from the locking pin openings and the winch assembly 152 is rotated in a first rotational direction thereby causing the cables 158 to be retrieved. As the cables 158 are retrieved, the cage 16 is moved in a first direction 202. The cage 16 is raised in the direction 202 until the cage 16 is disposed in the second position generally above the first position and generally above the fourth and the fifth bars 72 and 74.

After the cage 16 has been moved to the second position, the locking pin openings are aligned and the locking pin 194 then is inserted into the locking pin openings, the cage 16 is being supported in the second position via the cables 158. In the second position of the cage 16, the fourth and the fifth bars 72 and 74 are each removed from the positioning cups 58, 60, 62 and 64.

After the removal of the fourth and the fifth bars 72 and 74, the cage 16 is lowered to the third position generally near the ground surface 20. More particularly, the winch assembly 152 is rotated a small degree in the first direction of rotation to a position wherein the pressure is relieved from the locking pin 194, and the locking pin 194 then is removed from the locking pin openings. Thus, the winch assembly 152 is rotated in a second rotational direction whereby the cables 158 are released and the cage 16 is moved in a second vertical direction 204 until the cage 16 is disposed in the third position upon or generally near the ground surface 20.

The latching assembly 148 is "unlatched" and the gate 126 is moved to the opened position. The disable animal then is moved into the cage 16 in a conventional fashion, and the gate 126 subsequently is moved to the closed position (the latching assembly 148 being "latched").

After the animal has been loaded into the cage 16, the winch assembly 152 is rotated in the first rotational direction whereby the cables 158 are again retrieved thereby causing the cage 16 to be moved in the first direction 202, the cage 16 being moved in the first direction 202 until the cage 16 is disposed in the second position. The locking pin openings are aligned and the locking pin 194 is reinserted through the locking pin openings, such that the cage 16 and the animal retained therein are suspended from the cables 158 above the ground surface 20. The fourth and the fifth bars 72 and 74 are supported on the moveable frame 14 via the positioning cups 58, 60, 62 and 64. The cage 16 then is moved in the second direction 204 as described above, until the cage 16 is firmly positioned on the fourth and the fifth bars 72 and 74, the cage 16 being supported in the first position for moving the livestock transport apparatus 10 and the disabled animal to the site of the whirlpool bath apparatus 12.

The livestock transport apparatus 10 is towed to a position generally adjacent the whirlpool bath apparatus 12. The cage 16 then is moved from the first position and the second position, and the fourth and the fifth bars 72 and 74 are removed from the moveable frame 14 in a manner described before. In the second position, the cage 16 is disposed generally above the whirlpool bath apparatus 12. With the cage 16 in the second position, the livestock transport apparatus 10 is moved into the whirlpool bath apparatus 12. More particularly, the cage 16 is positioned in the second position directly above the whirlpool bath apparatus 12 such that the cage 16 can be inserted within the whirlpool bath apparatus 12, as shown more clearly in FIGS. 5 and 6.

The spacing between the first and the second bars 36 and 42 is sized and shaped such that the whirlpool bath apparatus 12 can be partially disposed within the opening 30 of the movable frame 14 as the livestock transport apparatus 10 is moved into the whirlpool bath apparatus 12, the first bar 36 being disposed on one side of the whirlpool bath apparatus 12 and the second bar 42 being disposed on the opposite side of the whirlpool bath apparatus 12 in this position of the livestock transport apparatus.

The operation of moving the cage 16 in the second direction 204 and into the third position is repeated for lowering the cage 16 into the whirlpool bath apparatus 12. When lowering the cage 16 into the whirlpool bath apparatus 12, the cage 16 should be lowered at a relatively slow rate to substantially reduce the loss of liquid resulting from the liquid contained in the whirlpool bath apparatus 12 from running or spilling over the side of the container forming the whirlpool bath apparatus 12.

After the cage 16 and the animal retained therein have been disposed into the whirlpool bath apparatus 12 in the third position, the other portions of the livestock transport apparatus 10 may remain in their present position until the treatment has been completed or, in the alternative, may be moved away from the cage 16 and the whirlpool bath apparatus 12 as desired in a particular application.

When the therapeutic treatment of the animal is completed, the above operations utilized to transport the animal to the whirlpool bath apparatus 12 are substantially performed in the reverse order. The animal then can be transported to a recuperation facility, such as a barn or merely "put out to pasture", as desired.

Changes may be made in the construction and the operation of the various parts, elements and assemblies described herein without departing from the spirit and scope of the invention as described in the following claims.

What is claimed is:

1. A livestock transport apparatus for moving livestock or the like from one location to another location, comprising:
   a cage;
   a movable frame, having a first side, a second side, a forward end and a rearward end, an opening being formed through the movable frame and a portion of the opening intersecting the rearward end of the movable frame, the cage being movable through the opening formed in the movable rame, a portion of the cage being engageable with a portion of the movable frame in a first position of the cage and the cage being supported via the movable frame in a position elevated a distance generally above the ground surface in the first position of the cage, the movable frame including:
   means removably connected to the movable frame having one position for engaging the cage in the first position of the cage and preventing the cage from being moved through the opening in the movable frame;
   means for movably supporting the movable frame; and
   positioning means, having a portion connected to the movable frame and a portion connected to the cage, for positioning the cage in the first position and for raising the cage relative to the first position to a second position wherein the cage is supported a distance above the means for engaging the cage in the first position of the cage, and for lowering the cage to a third position wherein the cage is disposed near the ground surface for loading the livestock into the cage, the means for engaging the cage in the first position of the cage being removable from the movable frame in the second position of the cage.

2. The apparatus of claim 1 wherein the movable frame is defined further as being removably connected to a vehicle and wherein the movable frame is defined further to include:
   a draw bar assembly connected to the movable frame and extending a distance therefrom, a portion of the draw bar assembly being removably connected to a vehicle for pulling the movable frame via the vehicle.

3. The apparatus of claim 1 wherein the positioning means is defined further to include:
   a hoisting frame connected to the movable frame and extending a distance generally vertically therefrom; and
   means connected to the hoisting frame and to the cage for raising and lowering the cage.

4. The apparatus of claim 3 wherein the means for raising and lowering the cage is defined further to include:
   a winch rotatable in a first rotational direction and in a second rotational direction;
   a pulley assembly connected to the hoisting frame; and
   a cable assembly, having one portion connected to the winch, one portion connected to the cage and one portion operatively connected to the pulley assembly, the cage being raised in response to rotating the winch in the first direction of rotation and the cage being lowered in response to rotating the winch in the second direction.

5. The apparatus of claim 4 wherein the means for raising and lowering the cage is defined further to include:
   locking means connected to the winch having a locked position for preventing the rotation of the winch thereby maintaining the cage in a predetermined position in the locked position of the locking means.

6. The apparatus of claim 1 wherein the cage is defined further to include:
   a floor;
   a wall connected to the floor and extending a distance generally vertically upwardly from the floor, the wall extending about a portion of the floor and substantially enclosing a space, the livestock being supportable on the floor and the wall retaining the livestock within the substantially enclosed space; and
   a gate formed in the wall, having an opened position and a closed position, the gate cooperating with the wall to form the substantially enclosed space and to retain the livestock within the substantially enclosed space.

7. The apparatus of claim 6 wherein the floor is defined further as being substantially circularly shaped and wherein the wall is defined further as extending about a portion of the floor generally near the outer periphery of the floor.

8. A livestock transport apparatus for moving livestock or the like from one location to another location, comprising:
   a cage;
   a movable frame, a portion of the cage being engageable with a portion of the movable frame in a first position of the cage and the cage being supported via the movable frame in a position elevated a distance generally above the ground surface in the first position of the cage, the movable frame comprising:
   a first bar having a first end and a second end;
   a second bar, having a first end and a second end, spaced a distance from the first bar;
   a third bar extending generally between the first bar and the second bar, having a first end and a second end, a portion of the third bar generally near the first end thereof being connected to a portion of the first bar generally near the first end of the first bar and a portion of the third bar generally near the second end thereof being connected to a portion of the second bar generally near the first end of the second bar;
   a fourth bar, having a first end and a second end, extendable generally between the first bar and the second bar in one position of the fourth bar;
   a fifth bar, having a first end and a second end, extendable generally between the first bar and the second bar in one position of the fourth bar;
   means removably connecting a portion of the fourth bar to a portion of the first bar generally near the second end of the first bar and removably connecting a portion of the fourth bar generally near the second end of the fourth bar to a portion of the second bar generally near the second end of the second bar; and
   means removably connecting a portion of the fifth bar generally near the first end of the fifth bar to a portion of the first bar generally near the first end of the first bar and removably connecting a portion of the fifth bar generally near the second end of the fifth bar to a portion of the second bar generally near the first end of the second bar, the fourth bar being spaced a distance from the fifth bar in the position of the fourth and the fifth bars removably connected to the first bar and the second bar and portions of the cage engaging a portion of the fourth bar and a portion of the fifth bar in the first position of the cage and in the position of the fourth and the fifth bars removably connected to the first bar and the second bar, the cage being movable between the first bar and the second bar in the position of the fourth and the fifth bars removed from the first bar and the second bar;
   means for movably supporting the movable frame;
   positioning means, having a portion connected to the movable frame and a portion connected to the cage, for positioning the cage in the first position and for raising and lowering the cage relative to the first position of the cage.

9. A livestock transport apparatus for moving livestock and the like from one location to another location, the livestock transport apparatus being utilized in connection with a whirlpool bath apparatus utilized to therapeutically treat livestock or the like, the livestock transport apparatus comprising:
   a cage for retainingly supporting livestock;
   a movable frame, having a first side, a second side, a forward end and a rearward end, an opening being formed through the movable frame and a portion of the opening intersecting the rearward end of the movable frame, the cage being movable through the opening formed in the movable frame, a portion of the cage being engageable with a portion of the movable frame and the cage being supported via the movable frame in a position elevated a distance generally above the ground surface in the first position of the cage, the movable frame including:
   means removably connected to the movable frame, having one position for engaging the cage in the first position of the cage and preventing the cage from being moved through the opening in the movable frame;
   positioning means, having a portion connected to the movable frame and a portion connected to the cage, for positioning the cage in the first position and for raising the cage relative to the first position of the cage to a second position generally above the whirlpool bath apparatus and for lowering the cage relative to the first position to a third position, a portion of the cage and livestock supported therein being disposable within a portion of the whirlpool bath apparatus in the third position of the cage, the cage in the second position being supported a distance above the means for engaging the cage in the first position of the cage, and said means for engaging the cage in the first position of the cage being removable from the movable frame in the second position of the cage, the cage in the third position being disposed near the ground surface for loading the livestock into the cage.

10. The apparatus of claim 9 wherein the opening formed through the movable frame is defined further as being sized such that a portion of the whirlpool bath apparatus is disposable within a portion of the opening formed through the movable frame as the movable frame is moved to a position for disposing the cage in the second position supported a distance generally above the whirlpool bath apparatus.

* * * * *